United States Patent Office 2,894,004
Patented July 7, 1959

2,894,004
BISPHENOLS

Andrew J. Dietzler, Midland, Mich., assignor to The Dow Chemical Company, Midland, Mich., a corporation of Delaware No Drawing. Application August 13, 1956
Serial No. 603,839

5 Claims. (Cl. 260—395)

This invention is concerned with bisphenols having the structure

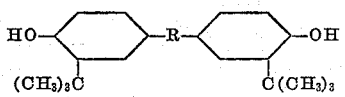

wherein R represents a structure containing a cyclic radical selected from the group consisting of benzylidene, cyclohexylidene, cyclopentylidene and alkyl substitution products thereof wherein the alkyl group contains from 1 to 4 carbon atoms, inclusive. These products are crystalline solids which are soluble in many common organic solvents such as benzene, toluene, alcohol and of very low solubility in water. These compounds are useful as stabilizers for inhibiting the deterioration of plastics, particularly as an antioxidant in the stabilization of polyethylene to thermal oxidation. These compounds are also useful as antimicrobial agents adapted to be employed for the control of bacterial and fungal organisms.

These bisphenols may be prepared by the reaction of 2-tertiary-butylphenol with an appropriate ring-containing carbonyl compound. Suitable carbonyl compounds are cyclic ketones and ring-containing aldehydes. Examples of suitable carbonyl compounds are cyclohexanone, cyclopentanone, 4-tertiary-butylcyclohexanone, 4-methylcyclohexanone, benzaldehyde, 4-tertiary-butylbenzaldehyde, m-tolualdehyde, p-tolualdehyde, 2-methylcyclopentanone, 2-methyl-4-isopropylbenzaldehyde, 4-isopropylbenzaldehyde, 3 - methylcyclohexanone, 3 - methyl - cyclopentanone, 2 - ethylcyclopentanone, 3 - isopropyl - cyclopentanone and 4 - isopropylcyclohexanone.

The reaction takes place smoothly in the temperature range of from 10° to 50° C. Good results are obtained when a substantial excess of the 2-tertiary-butylphenol reactant is employed. Preferred ratio of reactants are from 4 to 8 molar proportions of the 2-tertiary-butylphenol reactant per molar proportion of the cyclic ketone or aldehyde. The reaction is carried out in the presence of a hydrogen halide catalyst, e.g. hydrogen chloride or hydrogen bromide. Preferred procedures include saturating the reaction mixture with anhydrous halogen halide. The reaction may be carried out in the presence of a small amount of "ionizable sulfur compound" as promoter. The use of a promoter is particularly desirable when a ketone is employed as a reactant. Suitable promoters include hydrogen sulfide and alkyl mercaptans such as octanethiol. The amount of the promoter employed corresponds to from 0.03 to 0.2 gram atom of sulfur per mole of ketone.

In the preferred method of carrying out the reaction, the appropriate aldehyde or ketone and 2-tertiary-butylphenol and an ionizable sulfur compound, if employed, are mixed together and anhydrous hydrogen halide passed into the mixture to saturate or substantially saturate the mixture with respect to hydrogen halide. During the addition of hydrogen halide, the mixture is stirred and the temperature maintained in the range of from 20° to 40° C. After completion of the addition, the mixture is allowed to stand at room temperature for from 1 to 11 days to produce the desired bisphenol product.

The desired bisphenol product may be recovered as by extraction, washing and distillation. In a preferred procedure, nitrogen is passed through the reacted mixture at 60° C. for a period of from 1.5 to 2.5 hours to remove the hydrogen halide. The blown mixture is then heated to distill the water of reaction, unreacted starting materials and the promoter, if employed. The residue is then treated by passing steam therethrough at a temperature of 150°–170° C. at 25–35 millimeters pressure to volatilize any remaining phenol and to obtain as residue the desired bisphenol product. The latter may be dried in the usual ways such as by heating in a vacuum oven or by passing thereover a stream of inert gas such as nitrogen. The product may be purified, if desired, by recrystallization from solvents such as chlorobenzene or ethylcyclohexane.

Where an aldehyde is employed as a reactant, an alternative reaction method may be employed. In such a method, dry hydrogen halide is passed into cooled, stirred liquid 2-tertiary-butylphenol. The appropriate aldehyde is then added dropwise with stirring while the temperature is maintained at between 10° and 25° C. After the addition is complete, stirring is continued for several hours without cooling. The temperature may rise to 35° C. during this period. The mixture is then allowed to stand for several days at room temperature to produce the desired bisphenol. The latter may be recovered and purified in a manner similar to that above described.

The following examples illustrate the invention, but are not to be construed as limiting.

EXAMPLE 1

*4,4'-cyclohexylidenebis(2-tertiary-butylphenol)*

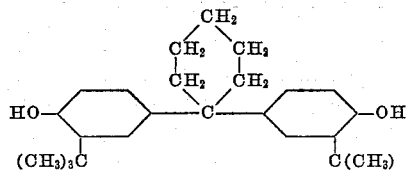

98.1 grams (1 mole) of cyclohexanone, 600 grams (4 moles) of 2-tertiary-butylphenol and 2 milliliters of octanethiol were combined. Anhydrous hydrogen chloride was bubbled into the mixture with stirring over a period of two hours. The reaction was somewhat exothermic and the temperature of the liquid mixture was maintained in the range of from 32° to 44° C. during the addition. The resulting mixture was allowed to stand at room temperature for 26 hours. At the end of this period the reaction mixture was warmed to 60° C. and a stream of nitrogen passed thereover to remove hydrogen chloride. The mixture was then heated to distill out the water of reaction and unreacted starting materials. Steam was blown into the residue at from 160° to 170° C. to volatilize any remaining phenol and to obtain a 4,4'-cyclohexylidenebis(2-tertiary-butylphenol) product having a freezing point of 146° C. The latter was recrystallized first from chlorobenzene and then from ethylcyclohexane to recover the bisphenol product as a white crystalline solid melting at 167°–169° C. The product had a carbon content of 82.77 percent and a hydrogen content of 9.90 percent. The theoretical values are 82.3 percent and 9.6 percent, respectively.

EXAMPLE 2

*4,4'-benzylidenebis(2-tertiary-butylphenol)*

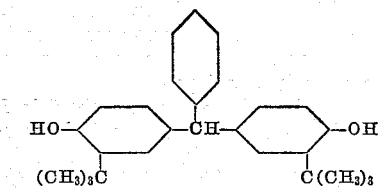

600 grams (4 moles) of 2-tertiary-butylphenol was placed in a reaction vessel. Dry hydrogen chloride was bubbled therethrough while stirring for a period of 30 minutes at 10° to 20° C. 85 grams (0.8 mole) of benzaldehyde was then added dropwise at 10° to 22° C. over a period of 55 minutes. Stirring was continued for 2.5 hours without cooling. The temperature rose to a maximum of 33° C. during this time. The mixture was allowed to stand for 2 days, and then heated to distill off the water of reaction and unreacted 2-tertiary-butylphenol and to recover a crude residue. Steam was passed through the latter at 150°–160° C. at 25 millimeters pressure to volatilize unreacted 2-tertiary-butylphenol. Nitrogen was then passed through the residue at 150° to 155° C. at 30 millimeters pressure to remove the water and to obtain a 4,4'-benzylidenebis(2-tertiary-butylphenol) product having a molecular weight of 376. The latter was an orange resin. The product had a carbon content of 83.7 percent and a hydrogen content of 8.25 percent. The theoretical values are 83.5 percent and 8.3 percent, respectively.

EXAMPLE 3

*4,4'-(4-tertiary-butylcyclohexylidene)bis(2-tertiary-butylphenol)*

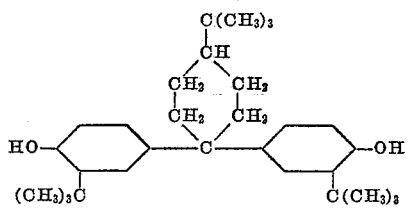

77.1 grams (0.5 mole) of 4-tertiary-butylcyclohexanone, 300 grams (2 moles) of 2-tertiary-butylphenol and 1 milliliter of octanethiol were combined. Dry hydrogen chloride was bubbled through the mixture with stirring for 1.75 hours while the temperature was maintained between 25° and 45° C. The mixture was allowed to stand at room temperature for 11 days. At the end of this period, nitrogen was passed therethrough at 60° C. for a period of 2 hours. The blown mixture was heated to distill water of reaction and unreacted 2-tertiary-butylphenol and to obtain a crude residue. Steam at 160°–165° C. at 35 millimeters pressure was then passed through the mixture to volatilize the remaining 2-tertiary-butylphenol. The residue was dried at 150° to 160° C. at 35 millimeters pressure in a nitrogen atmosphere to obtain a 4,4'-(4-tertiary-butylcyclohexylidene)bis(2-tertiary-butylphenol) product, which, after recrystallization from ethyl-cyclohexane, melted at 160.5°–161.2° C. This product had a carbon content of 81.65 percent and a hydrogen content of 8.24 percent. The theoretical values are 81.6 percent and 8.7 percent, respectively.

EXAMPLE 4

*4,4'-cyclopentylidenebis(2-tertiary-butylphenol)*

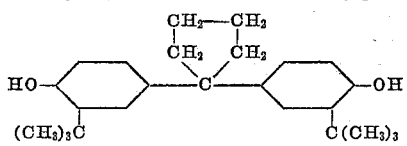

407.5 grams (2.72 moles) of 2-tertiary-butylphenol, 37.8 grams (0.45 mole) of cyclopentanone and 1 milliliter of octanethiol were mixed together. Anhydrous hydrogen chloride was bubbled into the mixture at a temperature of from 12° to 22° C. over a period of three hours. A total of 14.2 grams of hydrogen chloride was absorbed in the solution. The resulting mixture was allowed to stand at room temperature for two days.

The reaction mixture was then dissolved in 350 milliliters of benzene and the benzene solution washed five times with 150 milliliter portions of water and then heated first at atmospheric pressure and then at reduced pressure to distill off benzene and unreacted 2-tertiary-butylphenol. Steam was then blown through the product at 150°–156° C. at 30 millimeters pressure, and the resulting residue dried by heating at 152°–157° C. at 40 millimeters pressure to obtain a 4,4'-cyclopentylidenebis-(2-tertiary-butylphenol) product having a molecular weight of 366 as a red-brown brittle resin. The product had a carbon content 82.6 percent as compared with a theoretical value of 82.2 percent.

EXAMPLE 5

*4,4'-(3,5-dimethylbenzylidene)bis(2-tertiary-butylphenol)*

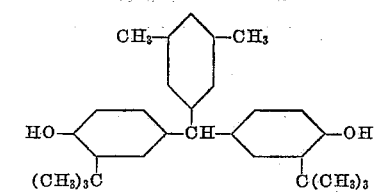

Dry hydrogen chloride is bubbled into 600 grams (4 moles) of 2-tertiary-butylphenol over a period of 1.5 hours. Cooling is employed to maintain the temperature between 10° and 25° C. as 134 grams (1 mole) of 3,5-dimethylbenzaldehyde is added to the mixture over a period of one hour. The mixture is then stirred for an additional two hours while allowing the mixture to warm up to room temperature. The mixture is then allowed to stand at room temperature for two days to complete the reaction. The crude reaction product is then heated to distill off a major portion of the unreacted 2-tertiary-butylphenol. Superheated steam is next blown through the mixture to steam distill any remaining unreacted phenol and to obtain as residue a 4,4'-(3,5-dimethylbenzylidene)bis(2-tertiary-butylphenol product).

The products of this invention are useful as antioxidants, particularly in inhibiting the oxidation of polyethylene. In representative operations, polyethylene and 0.1 percent by weight of certain of the bisphenol compounds (based on the weight of polyethylene) were dissolved in o-xylene to form a solution containing 40 percent by weight of polyethylene. This solution was cast on clear glass plates to form 30 mil films. Test discs 1.75 inches in diameter were cut from the films and employed to determine the effect of the bisphenols in inhibiting the absorption of oxygen by polyethylene. The inhibiting effect was determined by maintaining the disc in contact with gaseous oxygen recirculated thereover at a rate of 500 milliliters per minute at a temperature of 150° C. and 760 millimeters absolute pressure, employing a procedure similar to that described by R. H. Dornte, Ind. Eng. Chem. vol. 28, pp. 26–30, 1936, for determining the oxidation of white oils. The volume of the oxygen was measured at regular intervals of time and the change in volume of oxygen, i.e., the volume of oxygen absorbed was plotted against time. After the volume change per unit of time became constant measurements were discontinued. A smooth curve was drawn and extrapolated to zero. The time at zero absorption of oxygen represents the induction time or the time for which the added agent was effective in inhibiting oxidation of polyethylene and is a measure of the antioxidative properties of the compound. The results obtained are given in the following table. The values given by Ionol, a known proprietary antioxidant, and 4,4'-cyclohexylidenediphenol and 4,4'-benzylidenediphenol are also given.

TABLE

| Stabilizing compound: | Induction time (hours) |
|---|---|
| Ionol | 3.8 |
| 4,4'-cyclohexylidenediphenol | 3.8 |
| 4,4'-benzylidenediphenol | 5.7 |
| 4,4' - cyclohexylidenebis(2 - tertiary-butylphenol) | 28.4 |
| 4,4' - (4 - tertiary - butylcyclohexylidene)bis(2-tertiary-butylphenol) | 27.2 |
| 4,4'-benzylidenebis(2 - tertiary - butylphenol) | 23.8 |

I claim:
1. A bisphenol having the structure

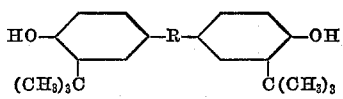

wherein R is a structure containing a cyclic radical and selected from a group consisting of benzylidene, cyclohexylidene and cyclopentylidene and alkyl substitution products thereof, containing from 1 to 4 carbon atoms, inclusive, in the alkyl group.
2. 4,4′-cyclohexylidenebis(2-tertiary-butylphenol).
3. 4,4′-benzylidenebis(2-tertiary-butylphenol).
4. 4,4′-(4-tertiary-butylcyclohexylidene)bis(2-tertiary-butylphenol).
5. 4,4′-cyclopentylidenebis(2-tertiary-butylphenol).

References Cited in the file of this patent
UNITED STATES PATENTS

| | | |
|---|---|---|
| 1,986,423 | Arvin | Jan. 1, 1935 |
| 2,069,560 | Rothrock | Feb. 2, 1937 |
| 2,069,573 | Bolton | Feb. 2, 1937 |
| 2,464,207 | Bender et al. | Mar. 15, 1949 |
| 2,498,656 | De Groote et al. | Feb. 28, 1950 |
| 2,503,196 | Dietzler et al. | Apr. 4, 1950 |
| 2,538,725 | Johnson et al. | Jan. 16, 1951 |
| 2,542,688 | Johnson et al. | Feb. 20, 1951 |